(12) United States Patent
Mollenkopf

(10) Patent No.: US 6,496,536 B2
(45) Date of Patent: Dec. 17, 2002

(54) SYSTEM AND METHOD FOR ESTIMATING POWER

(75) Inventor: Steven Mollenkopf, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/277,029

(22) Filed: Mar. 25, 1999

(65) Prior Publication Data

US 2002/0118725 A1 Aug. 29, 2002

(51) Int. Cl.[7] .................. H04B 17/00; H04B 7/185; H04L 27/20
(52) U.S. Cl. .................. 375/227; 375/146; 375/308; 370/318
(58) Field of Search ................. 375/130, 146, 375/224, 225, 227, 299, 308; 370/311, 316, 318, 320; 455/226.1, 226.2, 226.3, 571, 572, 573, 574

(56) References Cited

U.S. PATENT DOCUMENTS

| 4,920,496 | A | | 4/1990 | Szczebak, Jr. | |
|---|---|---|---|---|---|
| 5,103,459 | A | | 4/1992 | Gilhousen et al. | |
| 5,271,034 | A | * | 12/1993 | Abaunza | 375/150 |
| 5,272,446 | A | * | 12/1993 | Chalmers et al. | 329/304 |
| 5,301,364 | A | | 4/1994 | Arens et al. | |
| 5,416,426 | A | * | 5/1995 | Okubo et al. | 324/751 |
| 5,422,909 | A | * | 6/1995 | Love et al. | 375/147 |
| 5,430,812 | A | * | 7/1995 | Barnsley et al. | 382/235 |
| 5,563,623 | A | * | 10/1996 | Barrett, Jr. | 345/98 |
| 5,598,179 | A | * | 1/1997 | Orlen et al. | 345/98 |
| 5,608,409 | A | | 3/1997 | Rilling | |
| 5,621,752 | A | * | 4/1997 | Antonio et al. | 375/144 |
| 5,903,554 | A | * | 5/1999 | Saints | 370/342 |
| 6,028,884 | A | * | 2/2000 | Silberger et al. | 375/130 |
| 6,072,841 | A | * | 6/2000 | Rahnema | 375/325 |
| 6,081,822 | A | * | 6/2000 | Hillery et al. | 708/445 |
| 6,115,409 | A | * | 9/2000 | Upadhyay et al. | 375/144 |
| 6,154,487 | A | * | 11/2000 | Murai et al. | 375/150 |
| 6,304,140 | B1 | * | 10/2001 | Thron et al. | 330/149 |

FOREIGN PATENT DOCUMENTS

EP          0828352          3/1998

* cited by examiner

Primary Examiner—Young T. Tse
(74) Attorney, Agent, or Firm—Philip R. Wadsworth; Gregory D. Ogrod; Jae-Hee Choi

(57) ABSTRACT

A system and method for estimating the power of a signal. The signal is compared to and separated into a plurality of ranges. Each range is assigned a particular output value. The output values approximate the square of the input signal based on known characteristics of the input signal. A low pass filter is used to average a plurality of the output values.

21 Claims, 4 Drawing Sheets

SYSTEM AND METHOD FOR ESTIMATING POWER

BACKGROUND OF THE INVENTION

1. Field of the Invention

The present invention relates generally to mobile communication systems. More particularly, the present invention relates to a system and method for estimating the power of a communication signal or set of signals forming a subbeam. The present invention is most applicable in a mobile communications system using satellites where keeping track of satellite power is critical.

2. Related Art

A satellite-based communications system is a means by which information is sent over a substantial distance. Typical satellite-based communications systems use base stations referred to as gateways, and one or more satellites to relay communications signals between the gateways and one or more user terminals. Gateways provide communication links from each user terminal to other user terminals or users of other connected communications systems, such as a public telephone switching network. The user terminals can be fixed or mobile, such as a mobile telephone, and are located anywhere they can communicate with a satellite.

A satellite transponder is the component in a satellite that receives and transmits signals from and to gateways and user terminals. A satellite transponder must be able to carry a large number of subscribers simultaneously in order to be cost effective. Various satellite access schemes such as time division multiplex access (TDMA) and code division multiplex access (CDMA) spread spectrum allow access to transponders by a large number of subscribers. Digital CDMA is preferable to other satellite access schemes as more communication signals can be carried at a lower cost and higher quality. This is due in part because CDMA systems enable use of low powered signals which minimize cross channel interference and conserve satellite power.

In a typical spread-spectrum communication system, preselected pseudorandom noise (PN) code sequences are used to modulate or 'spread' user information signals over a predetermined spectral band prior to modulation onto a carrier for transmission as communication signals. PN spreading is a method of spread-spectrum transmission that is well known in the art.

In a typical CDMA spread-spectrum communication system, channelizing codes are used to discriminate between signals for different users within a cell or between user signals transmitted within a satellite beam, or sub-beam, on a forward link (i.e., the signal path from the base station or gateway to the user transceiver). That is, each user transceiver In a CDMA system each customer, subscriber, or user terminal is assigned an individual, orthogonal, communications channel by using 'covering' or 'channelizing' orthogonal codes. Walsh functions are generally used to implement the channelizing codes, with a typical length being on the order of 64 code chips for terrestrial systems and 128 code chips for satellite systems. CDMA systems combine individual code channels into a single narrowband channel so that a large number of channels are spread throughout the same waveform. As a result, multiple customers or users simultaneously share the same "narrowband channel," which is referred to interchangeably herein as a "CDMA channel" "subbeam" or a "carrier". Because multiple customers or users share the use of the same subbeam, if one or more customer or user signals are transmitted at a higher power than signals intended for other customers or users on the channel, interference may occur which may result in unacceptable performance unless the number of users on the subbeam is reduced. More importantly, such extra power reduces the power available for other user signals and, thus, overall capacity.

In a typical CDMA system, a gateway and a satellite communicate via links which are spatially divided into a number of beams, for example 16, in both a forward and a return direction, referred to as links. On the forward link, information is transmitted by a gateway generally utilizing frequency division and polarization multiplexing. In an exemplary system design, the forward link uses a C-band frequency band that is divided into 8 individual 16.5 MHz "channels" or "beams" employing right hand circular polarization (RHCP) and 8 individual 16.5 MHz "channels" or "beams" employing left hand circular polarization (LHCP). These individual 16.5 MHz channels are in turn made up of 13 "subchannels" or "subbeams," each of 1.23 MHz bandwidth, that are frequency division multiplexed (FDM) together to form a beam. These FDM subbeams are the narrowband channels discussed above, formed by combining a number of code channels.

For transmission to a satellite, individual FDM subbeams are frequency multiplexed together to create one wideband channel. A wideband channel has a pre-selected bandwidth designed for the specific satellite system. In the present example, a bandwidth of 160 MHz is used which comprises 104 subbeams, 13 subbeams times 8 beams. The ability of a wideband channel to carry 104 subbeams is dependent on limiting the power of each subbeam to the minimum power necessary for high quality transmission. Thus, control of the power of the subbeams is needed for high quality transmission and to ensure efficient use of power which allows the maximum number of subbeams to be carried on a wideband channel.

A system and method for controlling the gain of individual narrowband channels (subbeams) using a wideband power measurement has been developed. That system and method uses a transmit power tracking loop (TPTL) to control the power of individual narrowband channels (subbeams) by adjusting the gain applied to a transmitted signal. This system and method is disclosed in U.S. Pat. No. 6,252,915, entitled System and Method for Gain Control Of Individual Narrowband Channels Using A Wideband Power Measurement, which is assigned to the assignee of the present invention, and incorporated, in its entirety, herein by reference. Both open loop and closed loop power control are used in the TPTL. The closed loop control requires the control of the power of each individual subbeam. To control the power of each subbeam it is necessary to determine the power of each subbeam. However, difficulties arise in measuring individual subbeam power in the time frames needed to effectively control gain. In addition, performing such power estimation can be very computationally intensive, especially for control software implementations. As a result, there is a need for an alternative system and method for determining or estimating the power of individual subbeams.

Determinations of the power of individual subbeams can also be used to monitor the power consumption of a satellite receiving the subbeams. The satellite requires power to receive and relay the subbeams. The satellite is powered by batteries which store solar energy collected by the solar panels. Because the satellite only charges while exposed to the sun, the power of the satellite is limited by the exposure of the satellite to the sun.

Because of the limited energy in a satellite, it is possible that the satellite can run out of energy. Thus, in order to properly operate the satellite, it is necessary to know how much energy is being used by each transmitted subbeam. For example, in order to divide up capacity among service providers, it is necessary to know the amount of power used in transmitting on an individual subbeam basis. Also, to protect the satellite from damage by overdriving the satellite, it is necessary to know how much power is being transmitted on each subbeam.

Proper management of the satellite battery is vital to the longevity of the satellite constellation. The energy removed from the battery in order to process traffic must be replenished during the charging time when the satellite is in the sun. If too much energy is removed to process the traffic, the satellite must stay in the sun longer or must tap the batteries' reserve power. The operating life of the battery is degraded when the battery reserve power is accessed. The quality of satellite energy estimation is in part a function of the estimation of the power of each subbeam. More specifically, power usage of a satellite can be measured by measuring the power of signals sent to the satellite. This is because a satellite transponder transmits signals at a power that is proportional to the power of the signals received by the transponder.

Thus, there is a need to estimate the power of each subbeam that is transmitted from a gateway to a satellite. These power estimates can be used to determine power consumption and can be used in control systems that adjust the power of each subbeam. More specifically there is a need to estimate the power of subbeams in order to keep track of the power consumption of and availability in a satellite. Additionally, there is a need to estimate the power of each subbeam in order to limit the power of each subbeam. Also, there is a need to estimate the power of subbeams in order to allocate capacity among service providers and to provide billing information. Furthermore, there is a need to estimate the power of subbeams in order to avoid overdriving satellites and to avoid violating flux density limits.

The system for estimating power should consume a minimal amount of power and have a low degree of complexity so that it occupies a minimal amount of space. This is because the size of integrated circuits or chips used to implement the power estimation system and the amount of power that a chip can handle may be limited. In addition, the larger a chip, i.e, the more logic gates on the chip, the more expensive the chip is to produce. Also, the more logic gates on a chip, the more power is required to drive the gates. Because a chip can only dissipate so much power, a chip with too many logic gates may also produce too much thermal energy, causing the chip to fail. Additionally, the more power required to drive a chip, the more expensive it is to drive the chip. Therefore, reducing the number of logic gates on a chip may reduce the cost of producing and powering the chip and increase the reliability of the chip.

SUMMARY OF THE INVENTION

The invention concerns a system and method for estimating the power of a signal in a satellite communications system. The signal is compared to and separated into a plurality of ranges by a separating means. Each range is assigned a particular output value. The output values approximate the square of the input signal based on known characteristics of the input signal. A low pass filter is used to average a plurality of the output values. In one embodiment, the low pass filter comprises an infinite impulse response filter.

A feature of the present invention is that when the input signal is represented by a predetermined number of bits, the assigned output values are represented by a number of bits which is less than twice the predetermined number of bits.

Another feature of the present invention is that when the input signal is represented by a predetermined number of bits, the assigned output values are represented by a number of bits which is less than the predetermined number of bits.

Another feature of the present invention is that when the input signal is produced by an I channel or a Q channel of a Quadriphase Phase Shift Key (QPSK) modulator, the total power of a signal created by the modulator can be determined based on a ratio of the I channel power to the Q channel power.

An additional feature of the present invention is that the output of the separating means represents an instantaneous power of the input signal and an output of the filter represents an average power of the input signal.

Still another feature of the present invention is that the output of the separating means is proportional to an instantaneous power of the input signal and an output of the filter is proportional to an average power of the input signal.

DETAILED DESCRIPTION OF THE PREFERRED EMBODIMENTS

Figure 1:
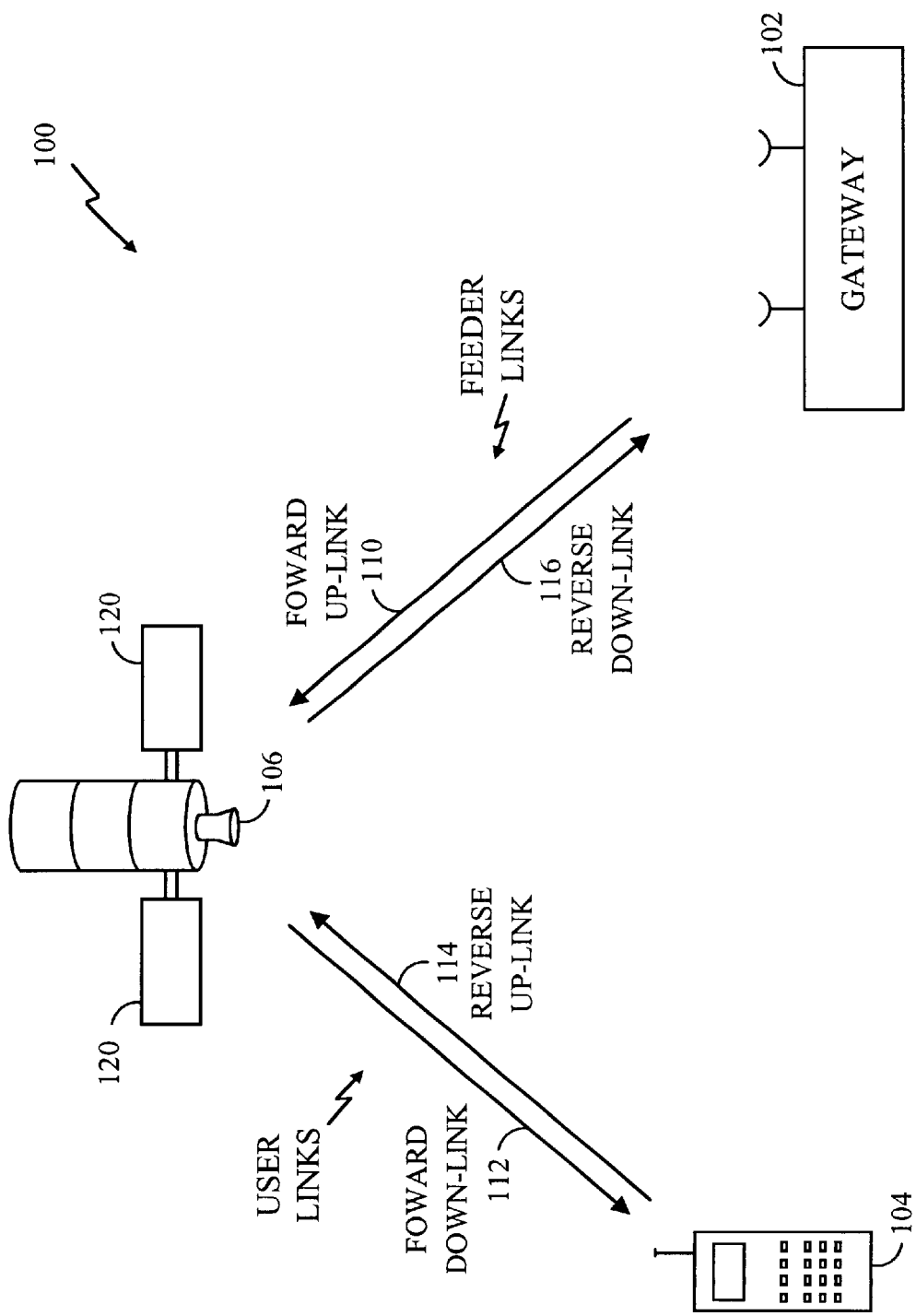
FIG. 1 illustrates an exemplary implementation of communication links used between a gateway and a user terminal in a mobile communications system.

The present invention is a system and method for estimating the power of a signal, such as one represented by either time varying voltage or current values. An instantaneous power of the signal can be determined by squaring a quantized representation of the signal. This is because power is proportional to the square of the voltage. The average power over time can then be determined based on these instantaneous power determinations. A digital squaring circuit can be used to square the signal. A low pass filter can be used to average the output of the squaring circuit.

In digital implementations, a squaring circuit output requires twice as many bits as the input if precision is not to be lost. This output, representing instantaneous power, is input into a low pass filter to average the power over time. Depending on the number of bits used to represent the input signal, the squaring circuit can be prohibitively large in terms of logic gates and can consume too much power. Furthermore, with many bits representing the squared output, a low pass filter following the squaring circuit may require a large number of bits internal to the filter to keep quantization noise from dominating the filter's output for all possible inputs. Also, a long filter time constant, relative to the reciprocal of the sample rate, can result in instability if too few bits are used to represent the feedback branches.

The present invention utilizes a sparse lookup table (LUT) to replace the squaring circuit discussed above. More specifically, the sparse lookup table is used to separate an input signal into a plurality of ranges, wherein each range is assigned a particular output value. These output values approximate the square of the input signal based on known characteristics of the input signal. The number of bits required to represent these output values can be greatly reduced by using the known characteristics of the input signal when selecting the plurality of ranges in the sparse LUT and knowing the required accuracy of the estimation.

By reducing the number of bits that represent the output, a low pass filter used to average the instantaneous power estimates can be more easily built on an integrated circuit chip with a reasonable number of bits internal to the filter. Additionally, the sparse LUT can be digitally implemented using less logic gates than a squaring circuit, which results in less power consumption and a smaller overall digital circuit size. By reducing the number of logic gates on a chip, the cost of producing and powering the chip may be reduced and the reliability of the circuit or chip may be increased.

Among other uses, the present invention could find use in a variety of wireless communication systems including satellite based telephone systems. In the preferred embodiment, the present invention is directed to estimating the power of a subbeam transmitted from a gateway to a satellite. More specifically, a preferred application is in Code Division Multiple Access (CDMA) wireless spread spectrum satellite communications systems. Below is an overview of a system in which the present invention may be used.

I. System Overview

FIG. 1 illustrates an example implementation of communication links used between gateway 102 and user terminal 104 of communications system 100. It is contemplated that communications system 100 uses CDMA type communication signals, but this is not required by the present invention. In the portion of communication system 100 illustrated in FIG. 1, satellite 106 and associated gateway 102 are shown for effecting communications with remote user terminal 104. The total number of gateways and satellites in such a system depends on the desired system capacity and other factors well understood in the art.

Communications links between user terminal 104 and satellite 106 are termed user links and the links between the gateway 102 and the satellite 106 are termed feeder links. Communication proceeds in a "forward" direction from gateway 102 on forward feeder link 110 and then down from satellite 106 to user terminal 104 on forward user link 112. In a "return" or "reverse" direction, communication proceeds up from user terminal 104 to satellite 106 on return user link 114 and then down from satellite 106 to gateway 102 on return feeder link 116.

On forward link 110 information is transmitted by gateway 102 utilizing frequency division and, where used, polarization multiplexing. As discussed above, in an example embodiment, the frequency band used is divided into 8 individual 16.5 MHz "channels" or "beams" using right hand circular polarization (RHCP) and 8 individual 16.5 MHz "channels" or "beams" using left hand circular polarization (LHCP). These individual 16.5 MHz channels are in turn made up of a set of frequency division multiplexed (FDM) "subchannels" or "subbeams", each of 1.23 MHz bandwidth. In the present example, there are up to 13 such subchannels, however more or fewer could be used, as is well known. Each FDM subbeam is created by a separate modulator circuit, and has an associated channel or beam power. Each FDM subbeam is divided into user channels using orthogonal codes in CDMA type spread spectrum systems, or time slots using TDMA type systems. The present invention is not limited by the specific type of channel modulation. In a CDMA communication system, each of the code channels, for example one of 128 Walsh covered channels, represents power consumed to service a user on the forward link. Some of the orthogonal code channels may also be used by pilot signals, which provide phase reference and timing references, and other overhead signals.

In the reverse direction, user terminal 104 transmits according to a spatially divided beam pattern. Satellite 106 receives these signals and frequency division multiplexes them for the satellite-to-gateway feeder link 106.

II. Gateway

Gateway 102 provides a communication link using satellite 106 between user terminals 104 and a local mobile telephone switching office (MTSO) (not shown), a public switched telephone network (PSTN) (not shown), or other connected communication system, as desired, as is well known. Gateway 102 receives telephone calls, data and/or fax data, or other information intended for a system user from the local MTSO or the PSTN and generates the code channels, subbeams, and beams discussed above to transmit to satellite 106. Satellite 106 then re-transmits these signals to one or more user terminals 104. In the return or reverse link direction, gateway 102 receives voice, data, fax data, or other information transmitted from user terminal 104, using satellite 106, and connects the user communication link or call to a MTSO or PSTN, which can then connect user terminal 104 to a standard telephone system, another mobile telephone system, or other known types of connected communication systems.

Gateway 102 modulates and transmits signals intended for user terminals, that arrive for example from a PSTN or the MTSO, to user terminal 104 via satellite 106. Gateway 102 also receives and demodulates signals from satellite 106. Transmission circuitry or equipment in gateway 102 includes modulators which generate subbeams. These modulators receive channel data and spread spectrum modulate the channel data. The modulated signal is then sent to an upconverter. Each modulator in gateway 102 is connected to a corresponding upconverter for upconverting the modulated signal from intermediate band frequency (IF) to a desired radio band frequency (RF). The upconverters are connected to an input of a summer which sums the individual subbeam signals into a widebeam signal. For additional details of a modulator see U.S. Pat. No. 5,103,459, entitled "System and Method for Generating Signal Waveforms in a CDMA cellular Telephone System," which is-incorporated by reference herein. Although not limited to this use, the present invention may be used to estimate the power of these subbeams.

III. Satellite

Satellite 106 is one of a number of satellites that comprise a low earth orbiting (LEO) satellite system. An exemplary LEO satellite system is planned to include 48 or more satellites traveling in low earth orbits approximately 763 miles from the earth's surface and inclined 50 degrees from the equator. In addition to LEO satellites, any communications device that receives and transmits information from and to an antenna, including satellite systems located at other distances and orbits, may be used with the present invention.

Satellite 106 receives and demultiplexes the signals, which may be transferred using two orthogonal polarizations, to obtain M individual signals each of a preselected bandwidth which corresponds to a desired spatially separated beam pattern. Typically, there are 16 signals or beams (M=16) for a satellite footprint each having a 16.5 MHz bandwidth. As mentioned above, each "beam" contains or is further divided into 13 "subbeams" operating on separate frequencies. Thus, satellite 106 handles approximately 208 (16×13) subbeams. However, those skilled in the art will readily understand that fewer or more beams and sub-beams can be employed according to each communication system and satellite constellation design.

Satellite 106 requires power to receive and relay the subbeams. Satellite 106 is powered by batteries which store solar energy collected by solar panels 120. Satellite 106 only charges while exposed to the sun. Thus, the power of satellite 106 is limited by its exposure to the sun. Because satellite 106 has limited energy, it is possible that satellite 106 can run out of energy. Thus, in order to properly operate satellite 106 it is necessary to know how much energy is being used by satellite 106 over any given time period. Power usage of satellite 106 can be measured by measuring the power of signals sent to satellite 106. This is because each satellite transponder transmits a signal having a power which is proportional to the power of the signal that was received by the satellite or transponder.

As stated above, satellite 106 has a transponder that transmits subbeams down to user terminals and gateways. The power used by the satellite transponder can be determined if the power of subbeams sent to satellite 106 is known. Because a transponder generally responds predictably to the amount of power in the signal it receives, controlling the power levels of signals sent from gateway 102 controls how much power satellite 106 uses. The distance between gateway 102 and satellite 106 can be determined from location identifying information sent to gateway 102 by satellite 106. By knowing that distance, the gain of a satellite transponder, and antenna gain, a desired or optimal amount of power for a signal sent from gateway 102 to satellite 106 can be determined. The estimated power of a subbeam determined using the present invention can be used to optimally adjust the power of the subbeam. It is noted that the specific method of optimizing or determining optimal power of a subbeam is beyond the scope of this invention. Additionally, the specific method the determining the power usage of the satellite based on the power of subbeams sent to the satellite is beyond this scope of this invention, and relates to techniques know to those skilled in the art of satellite design and operation.

It is also necessary to know the amount of power used in transmitting on an individual subbeam basis in order to divide up capacity among service providers. Since satellite power is the scarce resource in a satellite communications system, power consumption can be the basis for billing service providers for their use of satellite 106 (for example, service providers can pay more for more power). More specifically, if service providers are allocated capacity on a subbeam basis, measuring the power of each subbeam can provide useful billing information.

Also, to protect the satellite from damage due to over driving of the satellite, it is necessary to know how much power is being transmitted on each channel. Power must also be measured and controlled to avoid violating flux density limits.

IV. Power Estimator

Figure 2A:
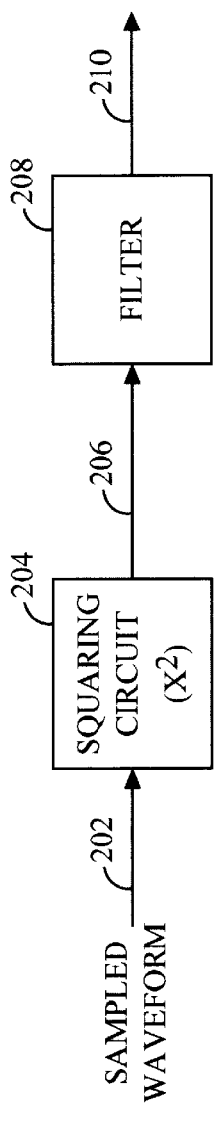
FIG. 2A is a high level block diagram of a system for measuring the power of a signal according to the present invention.

One method for estimating the power of a voltage waveform includes sampling the waveform, inputting the samples into a squaring circuit, and then filtering the output of the squaring circuit. FIG. 2A is high level block diagram of a system that uses such a method. As shown, sampled waveform 202 is input into squaring circuit 204. Squaring circuit output 206 of squaring circuit 204 is input into filter 208. Filter output 210 of filter 208 represents the averaged power of sampled waveform 202.

It is necessary that the samples of a waveform have enough resolution to meet the desired accuracy requirements for the estimation. For the purpose of example, we shall assume that a 12 bit sample of the waveform provides sufficient resolution. The 12 bits represent the voltage (amplitude) of the waveform when the waveform is sampled. Because the samples are 12 bits in length, there are $2^{12}$ (4096) different levels which can be represented. These different levels are scaled to a maximum voltage level. For example, if the maximum voltage is 2 Volts and the minimum voltage is −2 Volts, then a range of 4 Volts exists. Considering $4 \div 4096 = 9.8 * 10^{-4}$ then the accuracy of the sample is $\pm 4.9 * 10^{-4}$ Volts. This well known process of separating the amplitude of the waveform into a prescribed number of discrete amplitude levels is called quantization. The resultant waveform is said to be quantized.

Figure 2B:
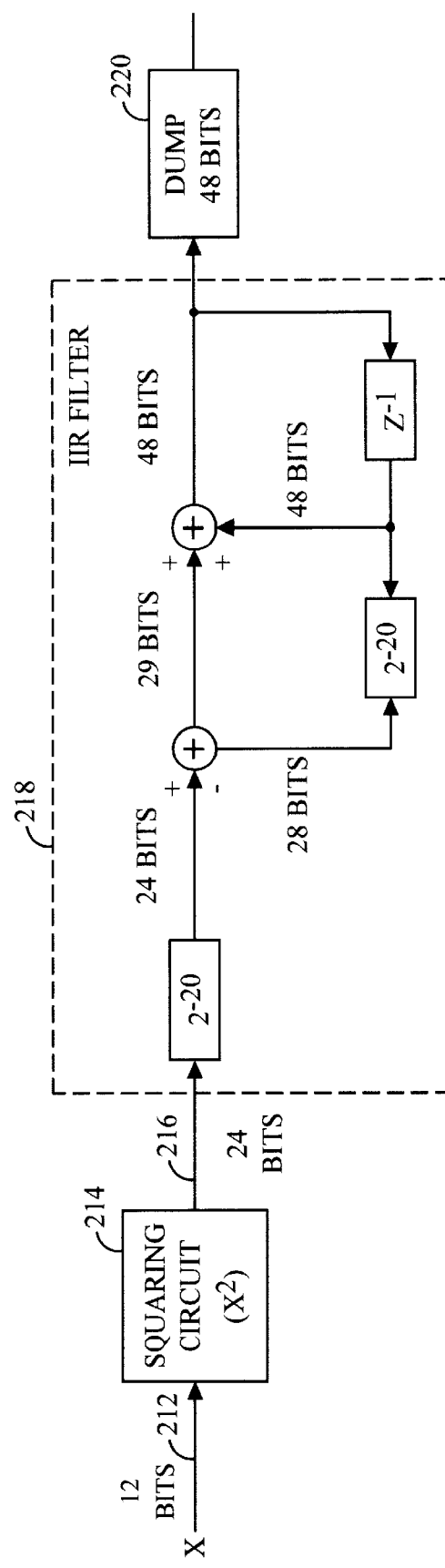
FIG. 2B is a high level block diagram of a system that estimates the power of a signal using 12 bit samples of the signal according to the present invention.

FIG. 2B is a high level block diagram of a system that estimates the power of a voltage waveform using 12 bit samples of the waveform. As shown, sample waveform 212 input into squaring circuit 214 is 12 bits in length. To represent the square of 12 bits, up to 24 bits may be required. That is, in digital implementations, a squaring circuit output requires twice as many bits as the input if precision is not to be lost. Thus, output 216 of squaring circuit 214 is shown to be 24 bits. This output represents the instantaneous power. As a result of requiring 24 bits, the squaring circuit can be prohibitively large in terms of logic gates and can consume too much power. Furthermore, with many bits representing the squared output, low pass filter 218 following squaring circuit 214 requires a large number of bits internal to the filter 218 to keep quantization noise from dominating filter output 220 for all possible inputs. As stated earlier, a long filter time constant, relative to the reciprocal of the sample rate, can result in instability if too few bits are used to represent the feedback branches.

Filter 218, generally a low pass infinite impulse response (IIR) filter, is used to average output 216 of squaring circuit 214. More specifically, filter 218 limits the bandwidth of the instantaneous power waveform produced by squaring circuit 214. To illustrate the large number of bits used to represent feedback branches within filter 218, the number of bits is shown above each branch. As can be seen, with 24 bits representing squared output 216, low pass IIR filter 218 following squaring circuit 214 requires a large number of bits internal to the filter to keep quantization noise from dominating filter output 220 for all possible inputs. Also, because filter 218 may have a long time constant, relative to the reciprocal of the sample rate, use of less bits to represent the feedback branches can result in instability.

Other types of low pass filters can be used besides an IIR type filter to implement filter 218 as would be understood by those skilled in the art. However, in a preferred embodiment filter 218 is an IIR filter comprising multiples of two branch weights. By using only multiples of two branch weights, all gain stages internal to IIR filter 218 can be implemented as shift registers. Additionally, because an IIR filter uses feedback, fewer logic gates are required to build the filter, for example when implemented on an integrated circuit chip. However, a disadvantage of using feedback is the introduction of the possibility of instability. This is because the use of feedback subjects the filter to oscillations and limit cycles, as is known. To prevent instability, enough bits must be maintained internal to the filter so that when there are oscillations they are small in magnitude.

Another type of filter which may be used is a finite impulse response (FIR) filter, which does not use feedback. One advantage of an FIR filter is that it is more stable than a IIR filter. However, the use of a FIR filter may be impractical, or at least less than optimal. Because a FIR filter does not use feedback, to have the capability of averaging many samples (e.g., thousands) the FIR filter would need to be extremely large in terms of the number logic gates required, again increasing size, cost, and complexity.

Figure 3:
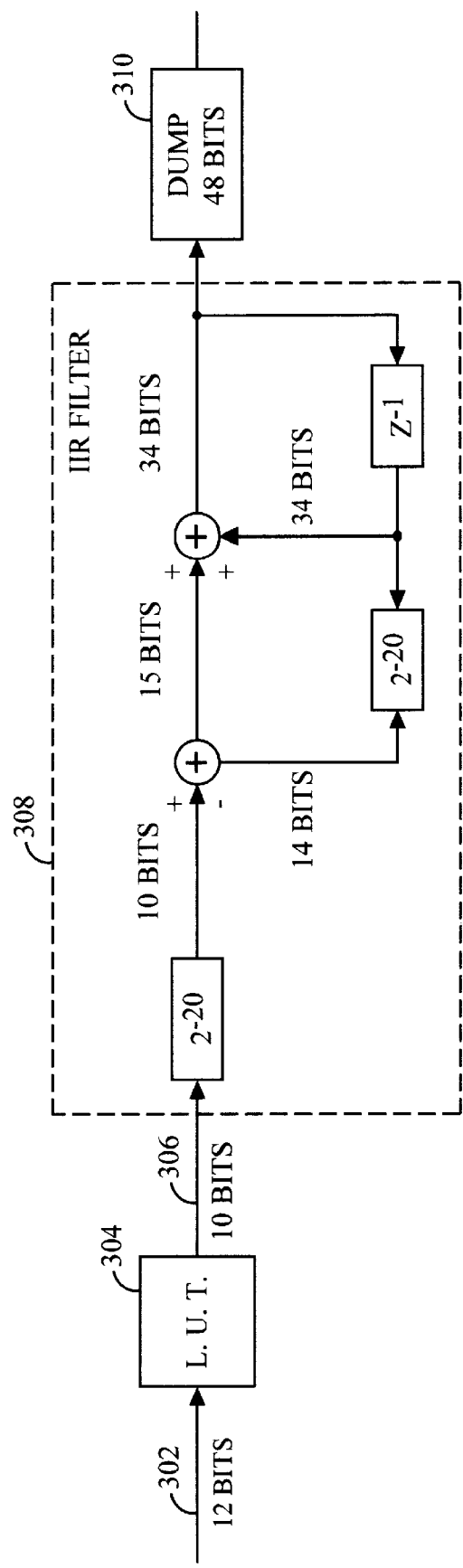
FIG. 3 is a high level block diagram illustrating a system for estimating the power of a signal according to an embodiment of the present invention.

FIG. 3 is a high level block diagram illustrating an embodiment of the present invention. A significant difference between FIG. 2B and FIG. 3 is that squaring circuit 214 of FIG. 2B is replaced with a circuit functioning as a sparse, or coarse, look-up table (LUT) 304. An example of a transfer function for LUT 304 is shown in Table 1 below.

TABLE 1

| Input Range, X | LUT Output, f(X) |
|---|---|
| $|X| = 0$ | 0 |
| $0 < |X| < 14$ | 1/1024 |
| $14 \leq |X| < 20$ | 2/1024 |
| $20 \leq |X| < 62$ | 4/1024 |
| $62 \leq |X| < 75$ | 6/1024 |
| $75 \leq |X| < 120$ | 46/1024 |
| $120 \leq |X| < 165$ | 110/1024 |
| $165 \leq |X| < 320$ | 114/1024 |
| $320 \leq |X|$ | 900/1024 |

The transfer function can be established through experimentation and thorough knowledge of input waveform 302 statistics. For the present example, the use of 10 bits to represent squared output 306 is based on shortcuts which can be taken and knowledge of the system. For example, if input waveform 302 is a CDMA waveform, and it is known that a CDMA waveform has a Gaussian distribution, a transfer function can be created having the desired accuracy. More specifically, by knowing that a distribution is Gaussian, a transfer function can be created where more accuracy is dedicated to values near a mean and less accuracy is dedicated to values far from the mean. Additionally, the transfer function can take into account that waveforms with small variances consume small amounts of satellite power, and, thus, the allowable error for these small waveforms is greater than for higher power waveforms.

The transfer function of Table 1 is for an input signal X having a mean of 0. As can be seen from Table 1, six different outputs exist for input signals having an absolute value range between 0 and 120, only two outputs exist for signal inputs having an absolute value range between 120 and 320, and only one output exists for input signals having an absolute value greater than or equal to 320. Thus, we can tell from Table 1 that it is most probable that the absolute value of input signal X is between 0 and 120 and it is least probable that signal X is above 320.

Each range in Table 1 may be referred to as a "bin". That is "$14 \leq |X| < 20$" is one bin, and "$62 \leq |X| < 75$" is another bin. Table 1 consists of only nine bins. When averaging the estimated power of a large number of samples, the accuracy of the power estimate of each sample need not be great so long as the integrated sum of the estimates provides the required accuracy. This allows use of a small number of bins or ranges (e.g., nine bins in the above example). The less bins there are, the less logic gates are required to implement a function.

As discussed above, Table 1 is generally optimized for Gaussian distributed input waveforms. So long as the input waveforms represent a large number of users, (a condition which results in significant power consumption) the assumption of a Gaussian waveform is justified. However, the present invention is not limited to signals having a Gaussian distribution. The present invention can be used for any signal having a distribution which is predictable. Examples of other distributions include sinusoidal distribution and uniform distribution. Using any of these distributions, a LUT similar to Table 1 can be optimized to produce a desired accuracy using a relatively small number of logic gates.

A circuit implementing Table 1, i.e., LUT 304, can be built in the form of a single integrated circuit or "chip" using comparators and/or other known logic gates, referred to as built "on-chip." In one embodiment, the circuit can be designed and built using Very High Speed Integrated Circuit (VHSIC) Hardware Description Language. VHSIC is a known large high-level VLSI design language used for determining a theoretically optimal gate arrangement for building a circuit on-chip.

Reducing output 306 to only 10 bits, as compared to 24 bits, allows low pass filter 308 to be built on-chip with a reasonable number of bits internal to filter 308. To illustrate the reduction in the number of bits used to represent feedback branches within filter 308, as compared to filter 208 above, for each branch within filter 308 the number of bits is shown. By reducing the number of logic gates on-chip, the cost of producing and powering the chip may be reduced and the reliability of the chip may be increased.

The present invention is not limited by the number of bits which represent inputs and outputs. Rather the present invention is only limited by the required or desired accuracy of the power estimation and the required number of bits to maintain stability within the particular filter being used.

Figure 4:
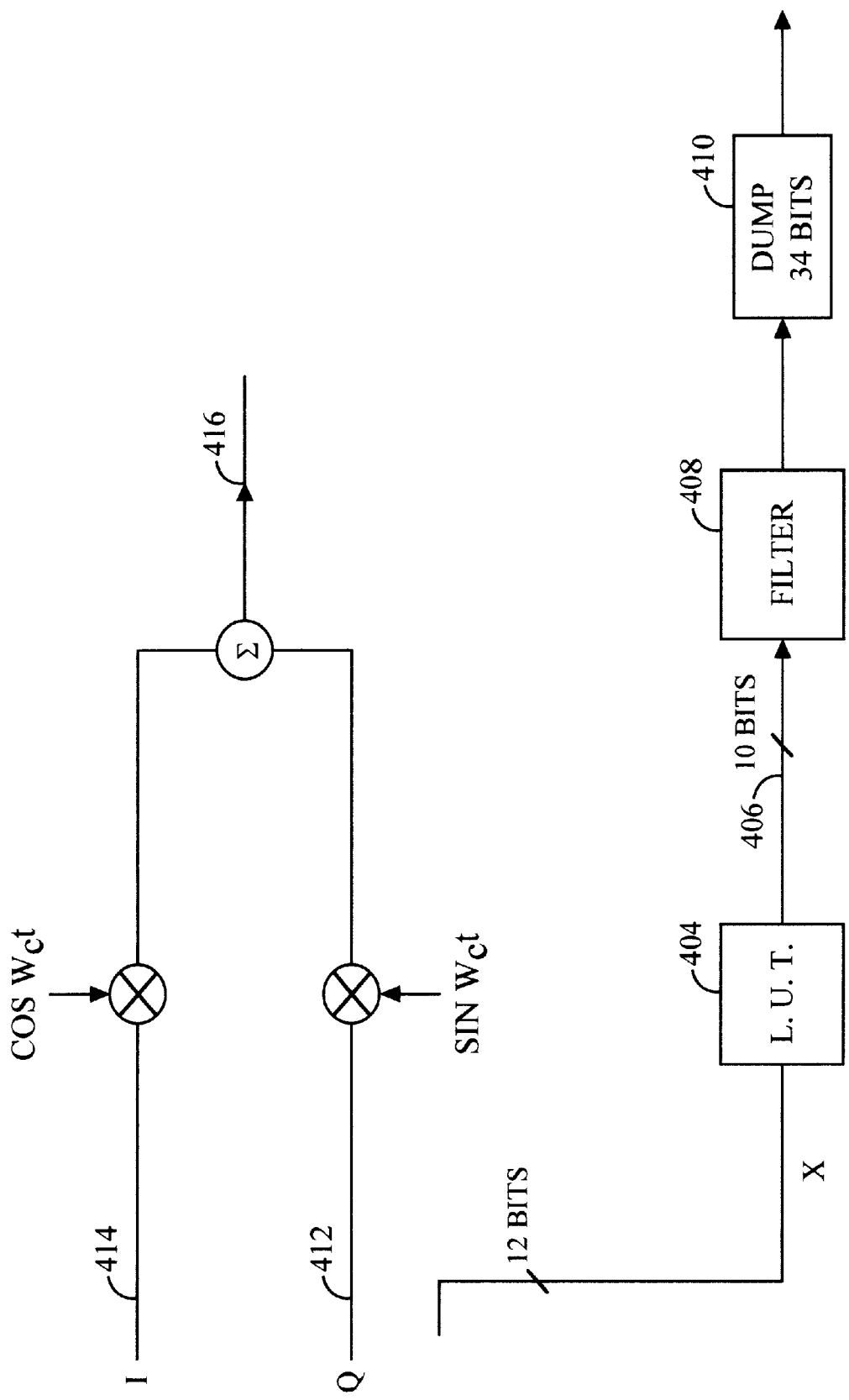
FIG. 4 is a high level block diagram illustrating a system for estimating the power of a signal according to an embodiment of the present invention.

The present invention can be used to estimate the power of any signal. However, in the preferred embodiment, the present invention is used to estimate the power of a subbeam, or CDMA channel in a communication system, such as one using satellites. FIG. 4 is a block diagram of the preferred embodiment of the present invention. FIG. 4 is similar to FIG. 3 in that LUT 404 is essentially the same as LUT 304, and filter 408 is essentially the same as filter 308. Prior to describing FIG. 4, a brief summary of a CDMA system is provided.

CDMA spread spectrum systems are well known in the art. By using PN code spreading, a method of spread-spectrum transmission that is well known in the art, a CDMA system produces a signal for transmission that has a bandwidth much greater than that of the data signal. More specifically, to create a subbeam, one or more preselected pseudo-noise (PN) code sequences are used to modulate or "spread" user information signals over a predetermined spectral band prior to modulation onto a carrier for transmission as communications signals. Details of creating a subbeam are described in the previously mentioned '459 patent. However, for the purpose of completeness, an example of a CDMA spread spectrum system is described below.

In a typical CDMA spread spectrum system, orthogonal channelizing codes are used to discriminate between different user signals transmitted within a subbeam on the forward link (i.e., the signal path from the gateway to a user terminal's transceiver). Walsh functions are generally used to implement the channelizing codes. Each orthogonally, Walsh, coded user signal is then put through a gain control element. Following the gain control element all of these signals are then summed together to form one composite data stream. This composite data stream is then split into two data streams, one for an in-phase channel (I channel) and one for a quadrature phase channel (Q channel) of a Quadrature Phase Shift Key QPSK) modulator. QPSK modulators are well known in the art. However, for completeness, QPSK modulation is briefly described. Each data stream (one on the I channel, one on the Q channel) is multiplied by separate PN sequences. Following the multiplication by the PN sequences the I channel data and the Q channel data are each upconverted 90 degrees out of phase from one another, by cosine and sine signals respectively, and then added together to produce one composite waveform. This composite waveform is a subbeam.

As shown in FIG. 4, and as described above, in-phase channel (I channel) 414 and quadrature phase (Q channel) 412 are produced within the modulator. The resulting signals are summed to form a subbeam. In QPSK waveforms, if the ratio of power between the I and Q channel is known, measuring the power of the I channel (or the Q channel) is enough to estimate the total signal power. In a preferred embodiment, the power of a subbeam is determined by estimating the power of only I channel 414 or Q channel 412. Then, using a known or measured ratio between the power of I channel 414 and Q channel 412, the total power of the combined signal 416 (that is, the subbeam) can be determined. In a preferred embodiment, the ratio of I channel 414 to Q channel 412 is 1:1. Thus, in the preferred embodiment the total power would be twice the estimated power of either I channel 414 or Q channel 412. Of course the ratio need not be 1:1, as would be readily understood by those skilled in the art, and depends on each desired communication system design.

More specifically, as shown in FIG. 4, the 12 bit samples representing voltage of Q channel 412 signal are input into sparse LUT 404. Output 406 of LUT 404, represented by 10 bits, is input into low pass filter 408. In the preferred embodiment, filter 408 is a IIR filter equivalent to filter 308 discussed above. The output of filter 408 represents the average power of Q channel 412. The power of summed signal 416 of both I channel 414 and Q channel 412 can then be determined based on the ratio between the two channels 414, 412. This summed signal 416 is a subbeam.

While various embodiments of the present invention have been described above, it should be understood that they have been presented by way of example only, not limitation. Thus, the breadth and scope of the present invention should not be limited by any of the above-described exemplary embodiments, but should be defined only in accordance with the following claims and their equivalents.

What I claim as my invention is:

1. A digital power estimator system for use in a wireless communications system comprising:
separating means, including a look-up table (LUT), for separating an input signal into a plurality of ranges defined in the LUT, each range being assigned a particular output value defined in the LUT, the output values approximating a square of the input signal based on known characteristics of the input signal; and
averaging means coupled to an output of said separating means for averaging a plurality of the output values from said separating means.

2. The digital power estimator system according to claim 1, wherein said averaging means comprises a low pass filter.

3. The digital power estimator system according to claim 2, wherein the output of said separating means represents an instantaneous power of the input signal and wherein an output of said filter represents an average power of the input signal.

4. The digital power estimator system according to claim 2, wherein said output of said separating means is proportional to an instantaneous power of said input signal and wherein an output of said filter is proportional to an average power of the input signal.

5. The digital power estimator system according to claim 2, wherein said low pass filter comprises an infinite impulse response filter.

6. The digital power estimator system according to claim 5, wherein said infinite impulse response filter includes only multiple of two branch weights, thereby enabling said infinite impulse response filter to be implemented using shift registers.

7. The digital power estimator system according to claim 1, wherein said known characteristics of said input signal comprise Gaussian distribution characteristics.

8. The digital power estimator system according to claim 1, wherein said input signal is produced by one of an I channel and a Q channel of a Quadriphase Phase Shift Key (QPSK) modulator, and wherein a total power of a signal created by said modulator can be determined based on a ratio of said I channel to said Q channel.

9. A digital power estimator for use in a wireless communications system comprising:
separating means for separating an input signal into a plurality of ranges, each range being assigned a particular output value, the output values approximating a square of the input signal based on known characteristics of the input signal; and
averaging means coupled to an output of said separating means for averaging a plurality of the output values from said separating means,
wherein said input signal is represented by a predetermined number of bits and wherein said assigned output values are represented by a number of bits which is less than twice said predetermined number of bits.

10. A digital power estimator for use in a wireless communications system comprising:
separating means for separating an input signal into a plurality of ranges, each range being assigned a particular output value, the output values approximating a square of the input signal based on known characteristics of the input signal; and
averaging means coupled to an output of said separating means for averaging a plurality of the output values from said separating means,
wherein said input signal is represented by a predetermined number of bits and wherein said assigned output values are represented by a number of bits which is less than said predetermined number of bits.

11. A satellite communications system comprising:
a gateway;
a user terminal;
a satellite for providing a communications link between said gateway and said user terminal;
a modulator within said gateway for modulating voice channel data to be sent to said user terminal via said satellite, wherein an output of said modulator is a subbeam; and means for estimating the power of the subbeam, including:
- separating means, including a look-up table (LUT), for separating an input signal into a plurality of ranges defined in the LUT, each range being assigned a particular output value defined in the LUT, the output values approximating a square of the input signal based on known characteristics of the input signal; and
- averaging means coupled to an output of said separating means for averaging a plurality of the output values from said separating means.

12. The satellite communications system according to claim 11, wherein said modulator includes an I channel and a Q channel, wherein the input signal is produced by one of said I channel and said Q channel, and wherein a total power of said subbeam created by said modulator can be determined based on a ratio of said I channel to said Q channel.

13. The satellite communications system according to claim 12, wherein said averaging means comprises a low pass filter.

14. The satellite communications system according to claim 13, wherein said low pass filter comprises an infinite impulse response filter.

15. The satellite communications system according to claim 14, wherein said infinite impulse response filter includes only multiple of two branch weights, thereby enabling said infinite impulse response filter to be implemented using shift registers.

16. The satellite communications system according to claim 15, wherein said known characteristics of said input signal comprise Gaussian distribution characteristics.

17. The digital power estimator system according to claim 14, wherein said output of said separating means is proportional to an instantaneous power of said input signal and wherein an output of said infinite impulse response filter is proportional to an average power of the input signal.

18. A satellite communications system comprising:
- a gateway;
- a user terminal;
- a satellite for providing a communications link between said gateway and said user terminal;
- a modulator within said gateway for modulating voice channel data to be sent to said user terminal via said satellite, wherein an output of said modulator is a subbeam; and
- means for estimating the power of the subbeam, including:
  - separating means for separating an input signal into a plurality of ranges, each range being assigned a particular output value, the output values approximating a square of the input signal based on known characteristics of the input signal; and
  - averaging means coupled to an output of said separating means for averaging a plurality of the output values from said separating means,
- wherein said input signal is represented by a predetermined number of bits and wherein said assigned output values are represented by a number of bits which is less than twice said predetermined number of bits.

19. A method for estimating the power in a wireless communications system, comprising the steps of:
- comparing an input signal to a plurality of ranges defined in a look-up table (LUT), wherein each range corresponds to a particular one of a plurality of output values defined in the LUT;
- assigning a particular output value defined in the LUTT to the input signal based on a result of said comparing step, wherein the output values represent an approximation of a square of the input signal based on known characteristics of the input signal; and
- averaging a plurality of the assigned output values.

20. The method according to claim 19, wherein said averaging step comprises inputting the output values of said assigning step into a low pass filter.

21. The method according to claim 19, wherein said input signal is produced by one of an I channel and a Q channel of a Quadriphase Phase Shift Key (QPSK) modulator, and further comprising the step of estimating the power of a subbeam based on an average determined in said averaging step and a ratio of said I channel to said Q channel.

* * * * *